United States Patent
Saito et al.

(12) 
(10) Patent No.: US 6,276,720 B1
(45) Date of Patent: Aug. 21, 2001

(54) SEAT BELT SHOULDER ADJUSTER

(75) Inventors: Kenichi Saito; Yasuhiro Aida, both of Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/455,540

(22) Filed: Dec. 7, 1999

(30) Foreign Application Priority Data

Dec. 7, 1998 (JP) .................................................. 10-347408

(51) Int. Cl.[7] .................................................. B60R 22/20
(52) U.S. Cl. .......................................................... 280/801.2
(58) Field of Search ............................ 280/801.2, 801.1, 280/808

(56) References Cited

U.S. PATENT DOCUMENTS

| | | | |
|---|---|---|---|
| 4,560,204 | * | 12/1985 | Zeumer et al. . |
| 4,577,888 | * | 3/1986 | Takada . |
| 4,611,825 | * | 9/1986 | Patterson . |
| 4,640,550 | * | 2/1987 | Hakansson . |
| 4,867,477 | * | 9/1989 | Escaravage . |
| 4,871,192 | * | 10/1989 | Escaravage et al. . |
| 4,872,704 | * | 10/1989 | Biller et al. . |
| 4,917,403 | * | 4/1990 | Gyoda et al. . |
| 4,938,914 | * | 7/1990 | Escaravage et al. . |
| 5,044,666 | * | 9/1991 | Griesemer . |
| 5,167,428 | * | 12/1992 | Garret et al. . |
| 5,758,737 | * | 6/1998 | Brown et al. . |

* cited by examiner

Primary Examiner—Paul N. Dickson
(74) Attorney, Agent, or Firm—McDermott, Will & Emery

(57) ABSTRACT

A seat belt shoulder adjuster has a rail and a slider, the slider having formed in it a webbing returning part through which the seat belt is returned to the passenger compartment of a vehicle. The rail is disposed along a pillar and fixed thereto. The slider is mounted to the rail so as to enable up and down movement with respect thereto, and webbing of a seat belt passes between the rail and the slider via the webbing returning part, into the passenger compartment of the vehicle.

29 Claims, 13 Drawing Sheets

SEAT BELT SHOULDER ADJUSTER

The contents of Application No. TOKUGANHEI 10-347408 filed on Dec. 7, 1998 in Japan is hereby incorporated by reference.

BACKGROUND OF THE INVENTION

1. Field of the Invention

The present invention is related to a shoulder adjuster of a vehicular seat belt.

2. Description of the Related Art

Three-point seat belts have been provided at seats in vehicles in the past, in which an adjuster is provided on a vehicle pillar for the purpose of adjusting the pull-out height of the seat belt.

SUMMARY OF THE INVENTION

In the seat belt adjust structure of the past, however, there are a large number of constituent parts, leading to the possibility of an increase in both manufacturing cost and weight. Additionally, because the adjuster protrudes greatly from the pillar, it can have the effect of making the interior space in the vehicle smaller.

Accordingly, it is an object of the present invention to provide seat belt adjuster having few constituent parts, and also having only a smaller protrusion into the passenger compartment of the vehicle.

To achieve the above-noted object, a seat belt adjuster according to the present invention is formed by a rail and a slider, the slider having a seat belt returning part formed thereon. The rail is disposed along and fixed to a vehicle pillar. The slider is attached to the rail so that it can move up and down with respect to the rail. The webbing of the seat belt passing between the rail and the slider is returned into the passenger compartment of the vehicle via the seat belt returning part of the slider.

According to the above-noted configuration, the slider is slid along the rail up and down with respect to the vehicle, enabling easy height adjustment.

When the above-noted height adjustment is performed, because the constituent parts of the above-noted structure are just the rail and the slider, there is a great reduction in the number of parts and a reduction in cost. Because it is possible to shorten the assembly process because of the extremely simplified structure, there is a great reduction in the manufacturing cost. The small number of parts also enables a weight reduction.

Additionally, because of the formation of a webbing returning part on the slider, there is no great protrusion into the passenger compartment of the vehicle, enabling the achievement of an attractive, large-appearing vehicle interior. Thus, it is possible to obtain a large interior space in the vehicle, with a reduction in cramping.

DESCRIPTION OF THE PREFERRED EMBODIMENTS

Figure 1:
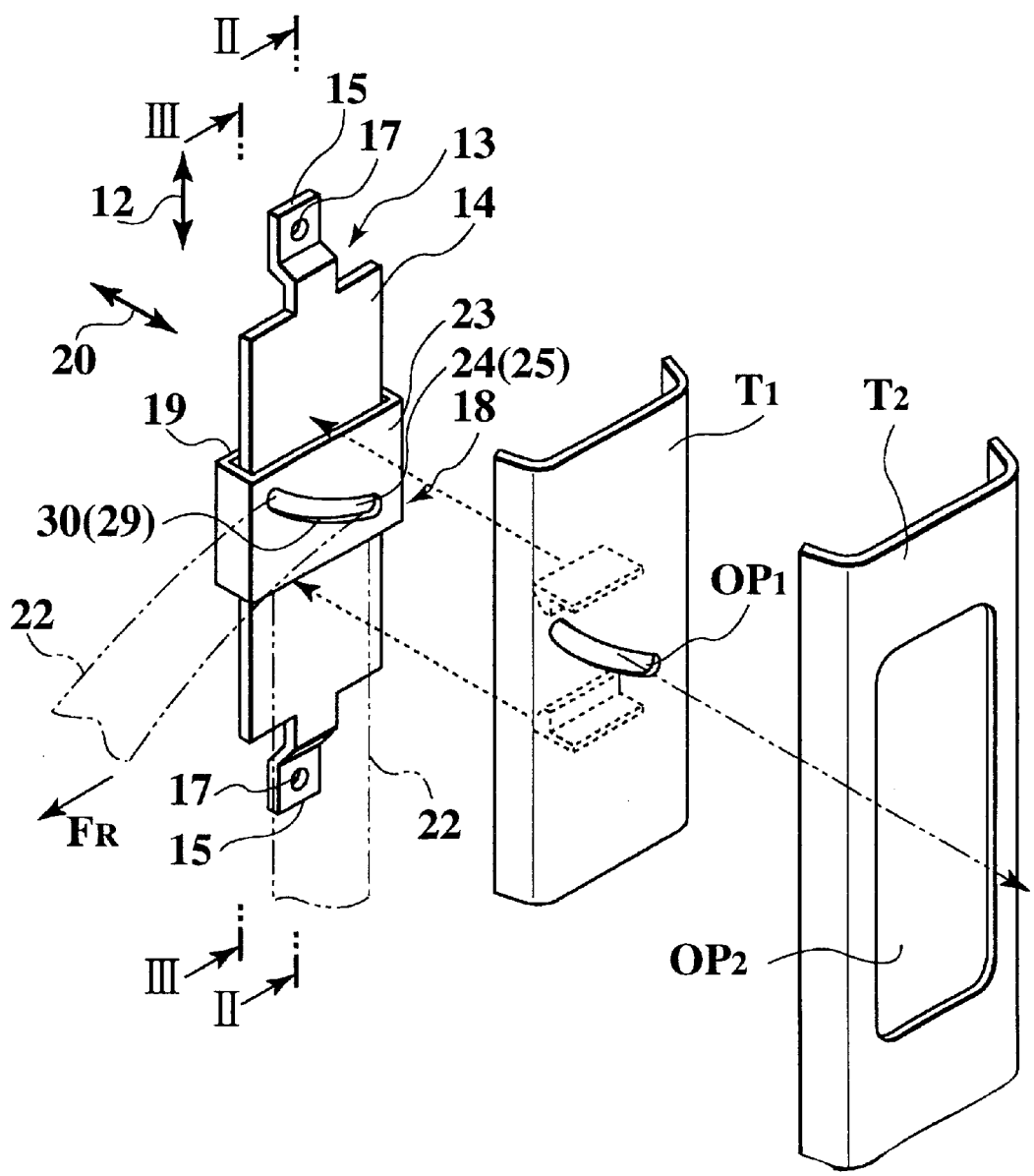
FIG. 1 is an exploded perspective view showing the first embodiment of the present invention.
Figure 2:
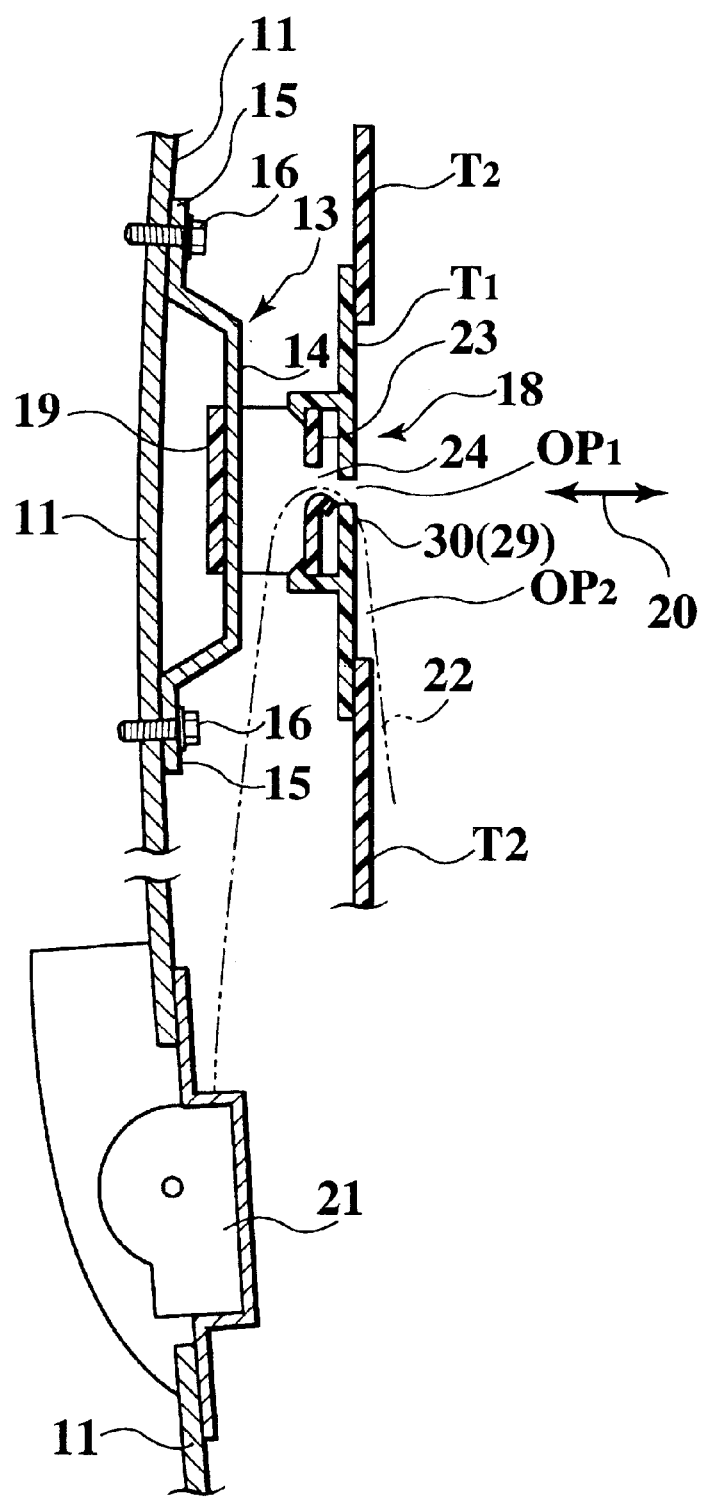
FIG. 2 is a cross-section view along the line II—II of FIG. 1.

Preferred embodiments of the present invention are described below in detail, with references being made to relevant accompanying drawings.

FIG. 1 to FIG. 10B illustrate the first embodiment of the present invention.

In terms of configuration, a rail 13 is provided in a direction that is substantially aligned with the top-to-bottom direction of the vehicle, along a pillar 11 of the vehicle. The center part 14 of the rail 13 is substantially a long rectangle. On the top and bottom ends of the rail 13 are formed mounting parts for mounting to the pillar 11, screws 16 or the like being passed through mounting holes 17 formed in these mounting parts 15.

A slider 18 is attached to the center part 14 of the rail 13 for the purpose of allowing height adjustment. The slider 18 has a substantially C-shaped cross-section, the two points 19 of the C shape being formed as part thereof by bending them toward the pillar 11. The slider 18 is attached to the outside of the center part 14 of the rail 13 so as to enable it to move substantially in a direction along the width of the vehicle, the two ends 19 thereof engaging with the center part 14 of the rail 13 so as to not become dislodged therefrom.

A webbing returning part 24 is formed on the slider 18, so that the webbing of a seat belt can be passed from the bottom between the slider 18 and the rail 13, or more precisely between the surface of the center part 23 of the C shape of the slider 18 facing the pillar 11 and the surface of the center part 14 of the rail 13 that faces the passenger compartment of the vehicle and returned to the inside of the passenger compartment. The seatbelt webbing 22 is taken up by a webbing takeup mechanism 21 positioned on the pillar 11 below the position of the seat belt shoulder adjuster structure.

In order to reduce the amount of twisting of the webbing if the return angle of the webbing 22 changes because of the person seated, the webbing returning part 24 has an approximate arc shape that is convex towards the bottom and front (direction indicated as FR).

The shoulder adjuster 32 of the present invention is formed by the rail 13 and the slider 18. In this adjuster 32, on the side edges of the rail 13 are formed engaging protrusions 33 which face towards the outside of the vehicle in the width direction.

Figure 3:
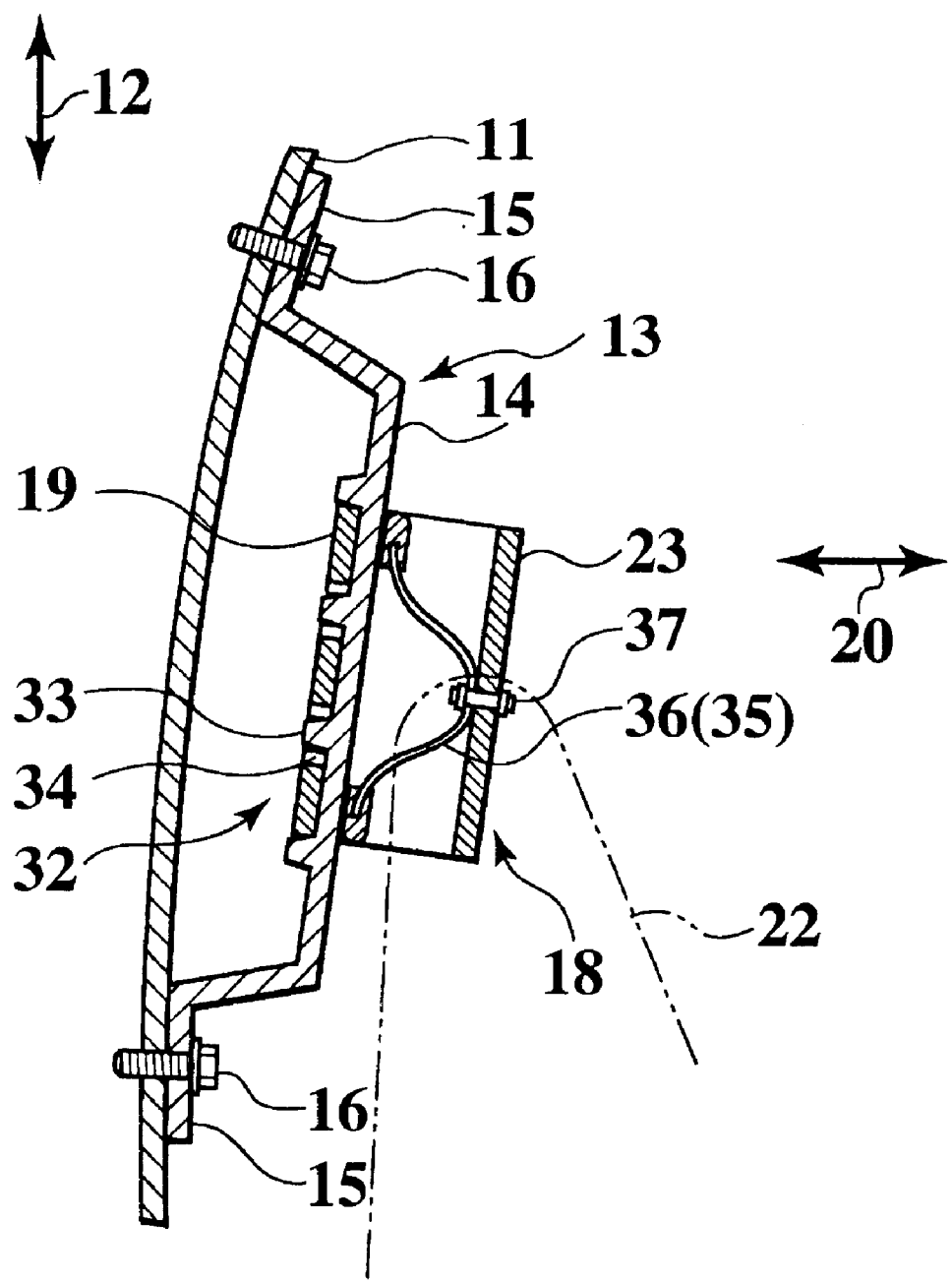
FIG. 3 is a cross-section view along the line III—III of FIG. 1.

In this adjuster 32, there are formed on the two bent ends 19 of the slider 18 engaging depressions 34 which engage with the engaging protrusions 33 of the rail 13. As shown in FIG. 3, the engaging protrusions formed on the rail 13 and the depressions 34 are provided at a prescribed interval in the top-to-bottom direction of the vehicle, so as to enable height adjustment.

Figure 8A:
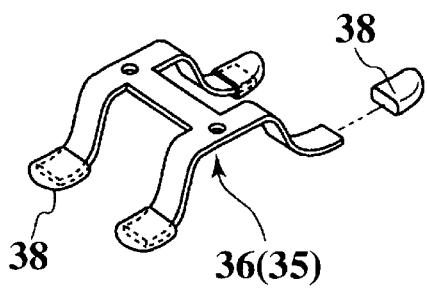
FIG. 8A is a perspective view showing an example of the shape of a leaf spring used in the present invention.
Figure 8B:
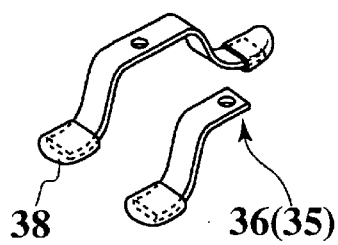
FIG. 8B is a perspective view showing another example of leaf spring.

Additionally, in the adjuster 32, between the rail 13 and the slider 18 there is an impelling member 35 which impels the engaging protrusions 33 and the depressions 34 in the engaging direction (in this case in a direction along the width of the vehicle). This impelling member 35 is H-shaped, as shown in FIG. 8A.

The reference numeral T1 denotes a slide trim piece that is attached by its legs to the slider 18, so that the webbing 22 can face the inside of the passenger compartment from the opening OP1 thereof, and T2 is a pillar trim piece that allows access to the trim piece T1 through the opening OP2 thereof.

The operation of this first embodiment of the present invention is as follows.

In a three-point seat belt, the seat belt webbing is pulled out from a takeup mechanism housed within a pillar of the vehicle pulled at an angle from one shoulder of the occupant the opposing hip, at which position it is attached and locked to a buckle provided on the seat.

Because the impelling member 35 disposed between the rail 13 and the slider 18 of the should adjuster 32 normally impels the slider 13 and the rail 18 in a direction that causes a protrusion 33 formed in one to engage with a depression 34 formed in another of the bent ends 19 of the C-shaped slider 13 and the rail 18 (in this case a direction along the width of the vehicle), there is engagement between the engaging protrusion 33 and the engaging depression 34, the slider 18 is locked with respect to the rail 13.

To adjust the height, the slider 18 is pushed towards the pillar 11, in opposition to the impelling force of the impelling member 35, so that the engagement between the engaging protrusion 33 and the engaging depression 34 is released, thereby releasing the locking of the slider 18 to the rail 13.

In this released condition, with the slider 18 pushed toward the pillar 11, by sliding the slider along the rail in a direction that is substantially the top-to-bottom direction 12 of the vehicle, the height thereof is adjusted.

After the height is adjusted, the hand is released from the slider 18, thereby releasing the force that had held it toward the pillar 11, so that the resilience of the impelling member 35 acts so as to cause engagement between an engaging protrusion 33 and an engagement depression 34, thereby locking the slider 18 again with respect to the rail 13.

In this manner, by pushing the slider 18 toward the pillar 11 it is easy to adjust the height of the slider 18, and by simply removing the hand from the slider 18, the slider is reliably locked into the new height position.

When performing the above operation, because the only elements used are the rail 18, the slider 13, and the impelling member 35, the count of parts is greatly reduced, thereby resulting is a reduction of cost and a great simplification of the structure, which also enables a shortening of the assembly process and a great reduction in manufacturing cost. The small parts count also has the effect of reducing the weight.

Additionally, with a webbing sliding part 24, over which the seat belt webbing 22 is returned, the need for a through ring, which was used in the past, is eliminated, and the amount of protrusion into the passenger compartment is reduced, thereby providing an attractive, larger-appearing vehicle interior. Thus, it is possible to obtain a large interior space in the vehicle, with a reduction in cramping.

In addition, because the slider 18 is resiliently held by the impelling member 35, the shock of striking the slider 18 is absorbed and softened. The impelling member 35 of the first embodiment of the present invention, as shown in FIG. 8A, is H-shaped, so that it impels the slider 18 uniformly in the width direction of the vehicle, thereby enabling the left and right pairs of engaging protrusions 33 to be engaged with the engaging depressions 34 with substantially the same impelling force, thereby providing reliable maintenance of the height position at which the seat belt webbing exits the slide opening.

Additionally, because the returning part is substantially arc-shaped, even if the webbing 22 return angle changes because of the seat occupant, it is possible to reduce twisting of the webbing 22.

Additionally, because the height adjustment is performed by engaging protrusions 33, engaging depressions 34, and an impelling member 35, the construction is simplified while enabling reliable adjustment of the height. By providing engaging protrusions 33 and engaging depressions 34 on both edges of the rail 13 and the slide 18, it is possible to eliminate interference with the returning part 24 for the webbing 22, thereby enabling a commensurate reduction in thickness dimension.

Figure 4A:
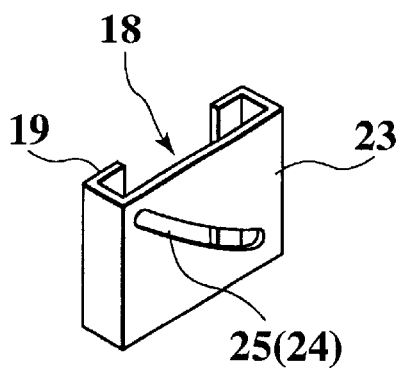
FIG. 4A is a perspective view showing the webbing returning part.
Figure 4B:
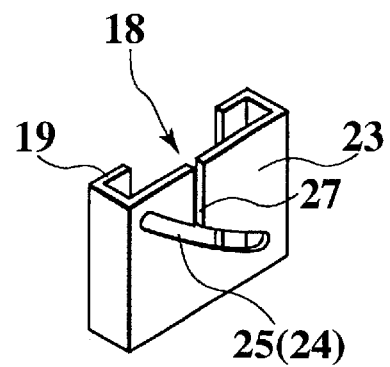
FIG. 4B is a perspective view showing another example of the webbing returning part.
Figure 4C:
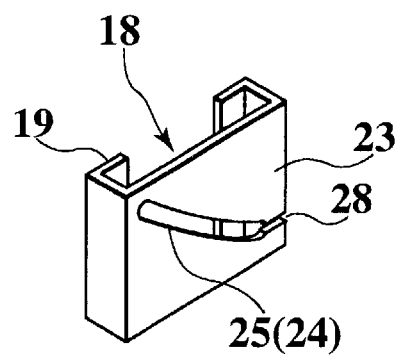
FIG. 4C is a perspective view showing another example of he webbing returning part.
Figure 4D:
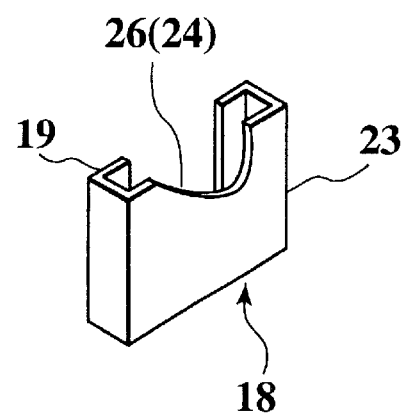
FIG. 4D is a perspective view showing another example of the webbing returning part.

Variations of the webbing return opening 25 formed in the center part 23 of the shaped slider are possible, as shown in FIG. 4A to FIG. 4C. It is also possible, as shown in FIG. 4D, to form the return opening 24 as a cutout formed at the top side of the center part 23 of the C-shaped slider 18. When the return opening 25 is used, the return opening 25 is made in the shape of a closed loop, as shown in FIG. 4A, with the webbing 22 passed therethrough beforehand. As shown in FIG. 4B, it is possible to form a slit 27 at the top part of the return opening 25, enabling the webbing 22 to be set into the return opening 25 by inserting it via this slit 27. As shown in FIG. 4C, it is also possible to form a slit 28 at the side part of the return opening 25, enabling the webbing 22 to be passed into the return opening 25 via the side slit 28.

By making the returning part 24 a return opening 25 in the center part of the C-shaped slider 18, as illustrated by the variations shown in FIG. 4A to FIG. 4B, it is possible to reliably old the webbing 22 of the seat belt.

Additionally, by making the returning part 24, as shown in FIG. 4D a return cutout 26 that is formed at the top side of the center part 23 of the C-shaped slider 18, the setting of the webbing 22 into the slider is facilitated.

Figure 5A:
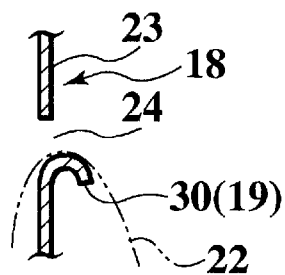
FIG. 5A is a cross-section view showing an example of the webbing sliding part.
Figure 5B:
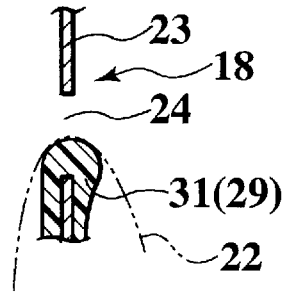
FIG. 5B is a cross-section view showing another example of the webbing sliding part.

It is also possible to provide a webbing sliding part 29 at the bottom edge of the returning part 24. One form of such a webbing sliding part would be the formation of a curved contact surface 30 with which the webbing 22 comes into contact, by a barring process, as shown in FIG. 5A. It is also possible, as shown in FIG. 5B, to form a molded curved resin sliding part 31 at the bottom edge that comes into contact with the webbing 22.

By forming a curve part 30 or a resin sliding part 31 at the lower edge of the return part 24 the slide 18, to serve as a webbing sliding part 29, wear of the webbing 22 is prevented, thereby extending the life of the webbing 22, in addition to aiding in the insertion and removal of the webbing 22 via the opening. Note that this sliding part 29 can be formed also on the slits 27 and 28.

Figure 11:
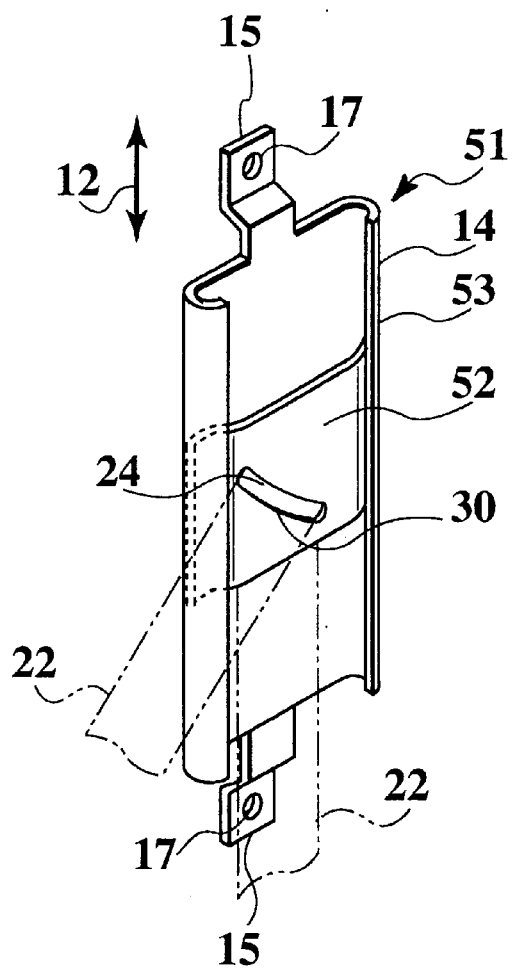
FIG. 11 is a perspective view of the second embodiment of the present invention.
Figure 12:
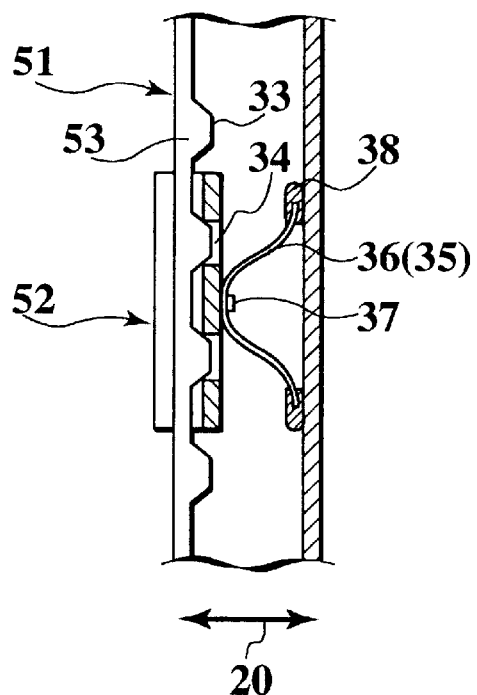
FIG. 12 is a cross-section view of the second embodiment shown in FIG. 11.
Figure 13:
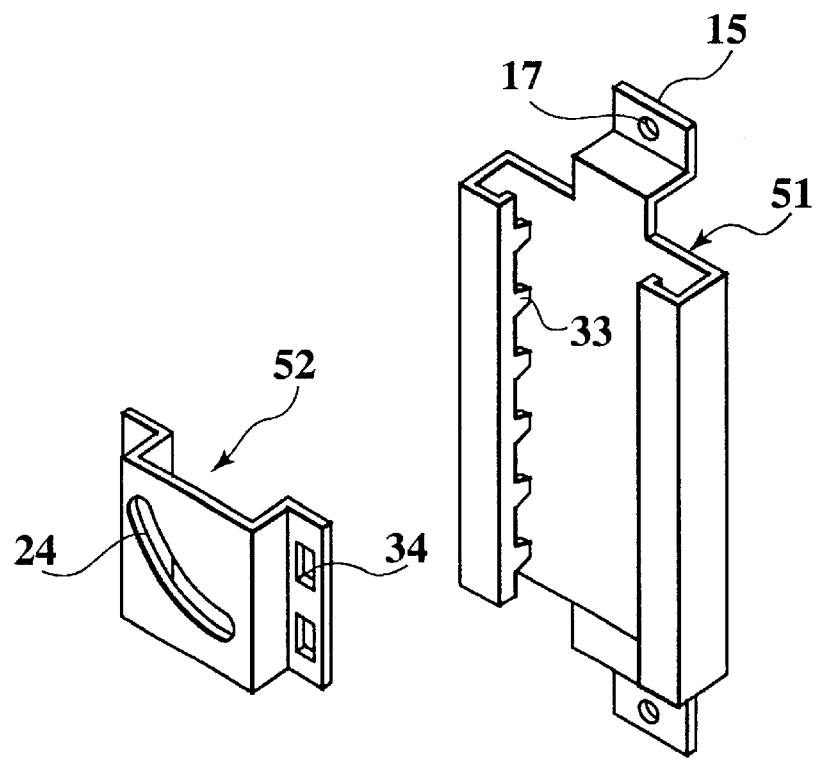
FIG. 13 is an exploded perspective view showing the engaging art between the slider and the rail shown in FIG. 1.

FIG. 11 to FIG. 13 illustrate the second embodiment of the present invention. Elements of the second embodiment that correspond to elements in the first embodiment have been assigned the same reference numerals.

In terms of configuration, the second embodiment has a rail 51 having a center part 14 that is substantially C-shaped when observed in plan view, and a slider 52 that is substantially hat-shaped when observed in plan view. The C-shaped bent ends 53 of the rail 51 is disposed so as to point toward the passenger compartment of the vehicle, the two sides of the hat-shaped slider 52 being engaged with the ends 53 of the C-shaped rail 51 so as to enable up-and-down movement of the slider 52 in a direction that is substantially along the top-to-bottom direction of the vehicle (refer to FIG. 12).

Figure 14:
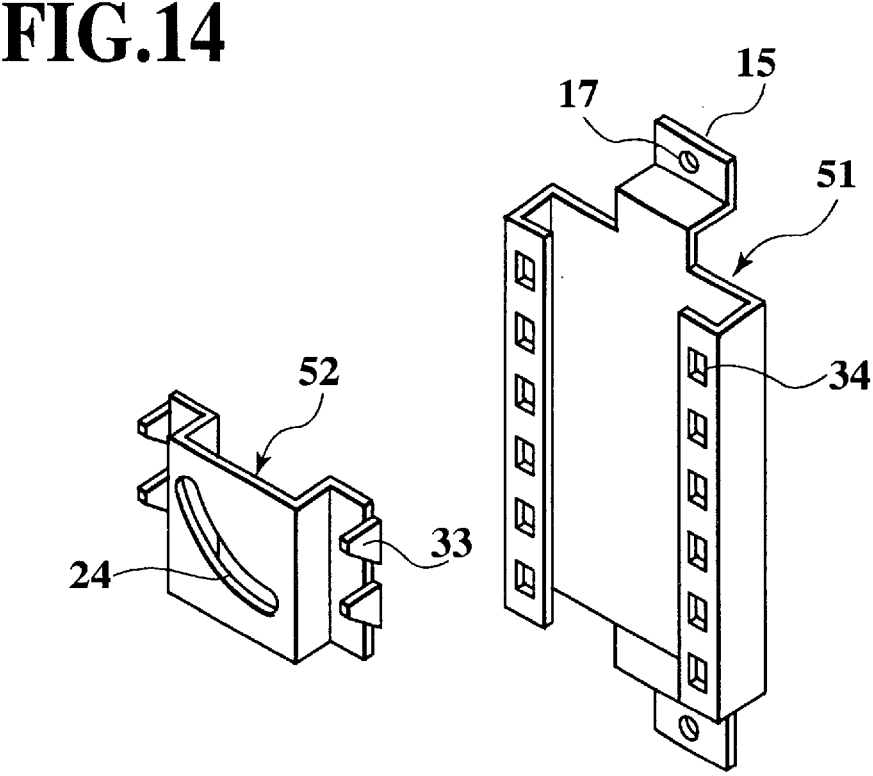
FIG. 14 is an exploded perspective view showing another example of the engaging part between the slider and rail.
Figure 15:
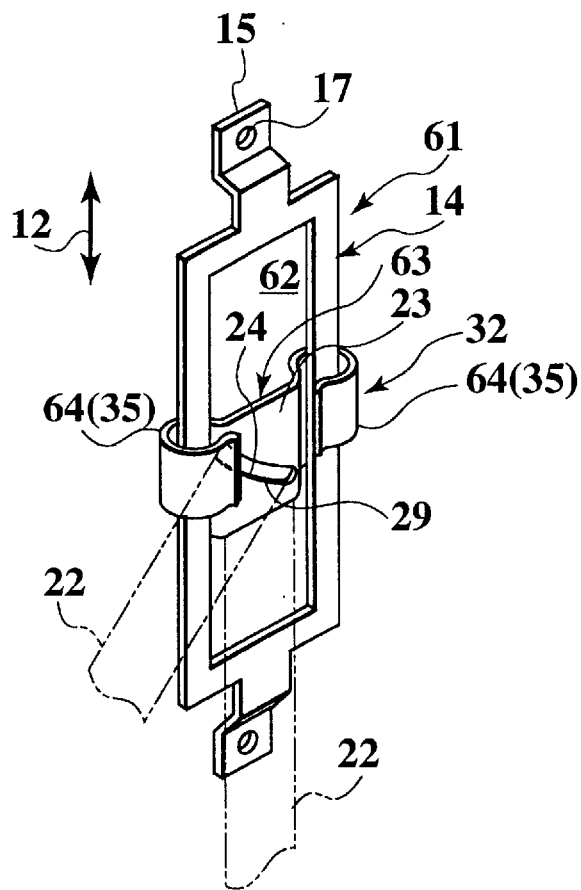
FIG. 15 is a perspective view of the third embodiment of the present invention.
Figure 16:
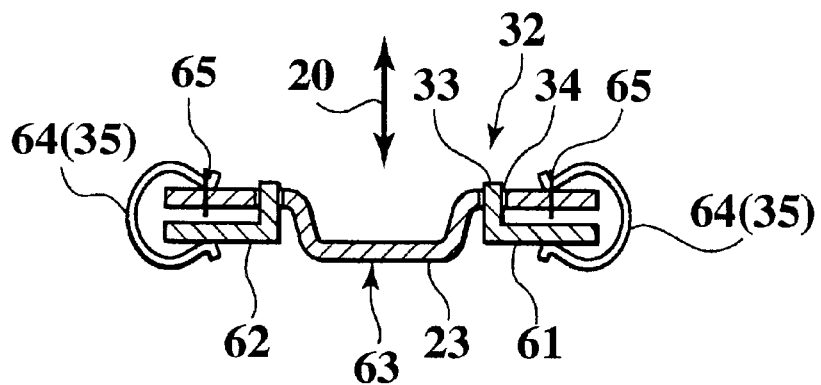
FIG. 16 is a cross-section view of the third embodiment shown in FIG. 15

As shown in FIG. 13, engaging protrusions 33 of the height adjuster 32 can be formed on the two bent ends 53 of the C-shaped rail 52 so as to face toward the outside of the pillar 11, with engaging depressions 34 being formed on the two ends of the hat-shaped slider 52. As shown in FIG. 14. it is alternately possible to have engaging protrusions 33 formed on the two ends of the hat-shaped slider 52 so as to face toward the passenger compartment of the vehicle and have engaging depressions 34 formed on the two bent ends 53 of the rail 51.

Other aspects of the second embodiment are the same as described with regard to the first embodiment, both in operation and achieved effect.

Figure 8C:
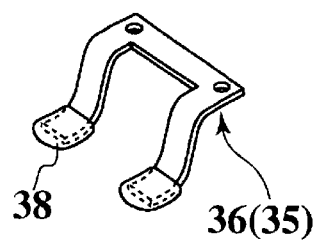
FIG. 8C is a perspective view showing another example of a leaf spring.
Figure 8D:
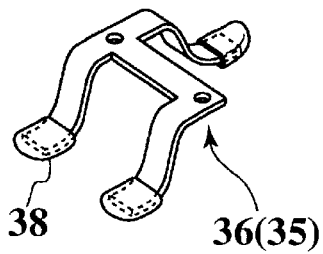
FIG. 8D is a perspective view showing another example of a leaf spring.
Figure 8E:
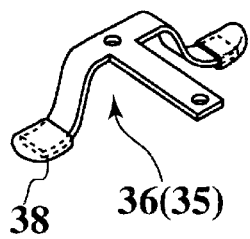
FIG. 8E is a perspective view showing another example of a leaf spring.
Figure 8F:
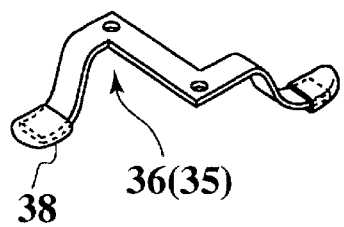
FIG. 8F is a perspective view showing another example of a leaf spring.
Figure 9:
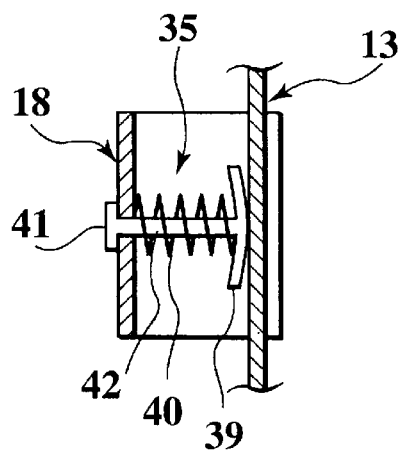
FIG. 9 is a cross-section view showing another impelling member.
Figure 10A:
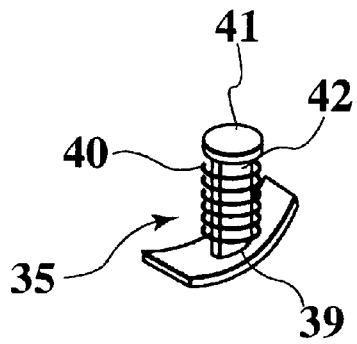
FIG. 10A is a perspective view showing the shoe and coil spring shown in FIG. 9
Figure 10B:
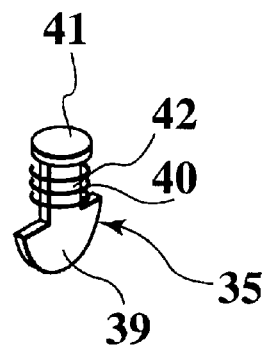
FIG. 10B is a perspective view showing another shoe and coil spring.

It is also possible to apply the variations of returning parts 24 shown in FIG. 4, the variations of the sliding part 29 shown in FIG. 5, and the variations of impelling elements 35 shown in FIG. 8 to FIG. 10 to the second embodiment.

FIG. 15 to FIG. 18 show the third embodiment of the present invention. Elements in this embodiment which correspond to equivalent elements in the first and second embodiments are assigned the same reference numerals and will be described using those reference numerals.

In terms of configuration, in the third embodiment the center part 14 of the rail 61 is a long rectangular with a long hole 62 that extends along the top-to-bottom direction of the vehicle, the slide 63 having a cross-section that is substantially hat-shaped when observed in end-on. The two side parts of the slider 63 makes contact with the two sides of the rear surface of the rail 61, with the center part 23 of the slide protruding at the long hole 62. Additionally, resilient clips 64 are fitted as impelling members 35 between the two ends of the slider 63 and the rail 61. These resilient clips 64 are fixed to the two sides of the slider 63 by means of a pin 65 or the like (refer to FIG. 16).

Figure 17:
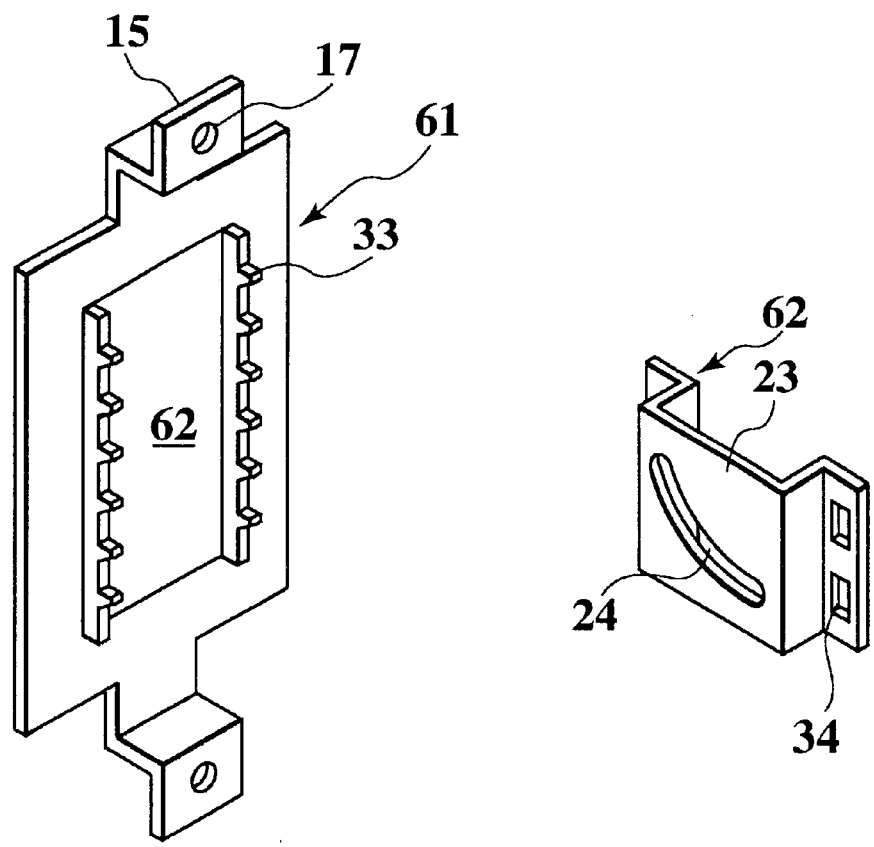
FIG. 17 is an exploded perspective view showing the engaging part between the slider and rail shown in FIG. 15.
Figure 18:
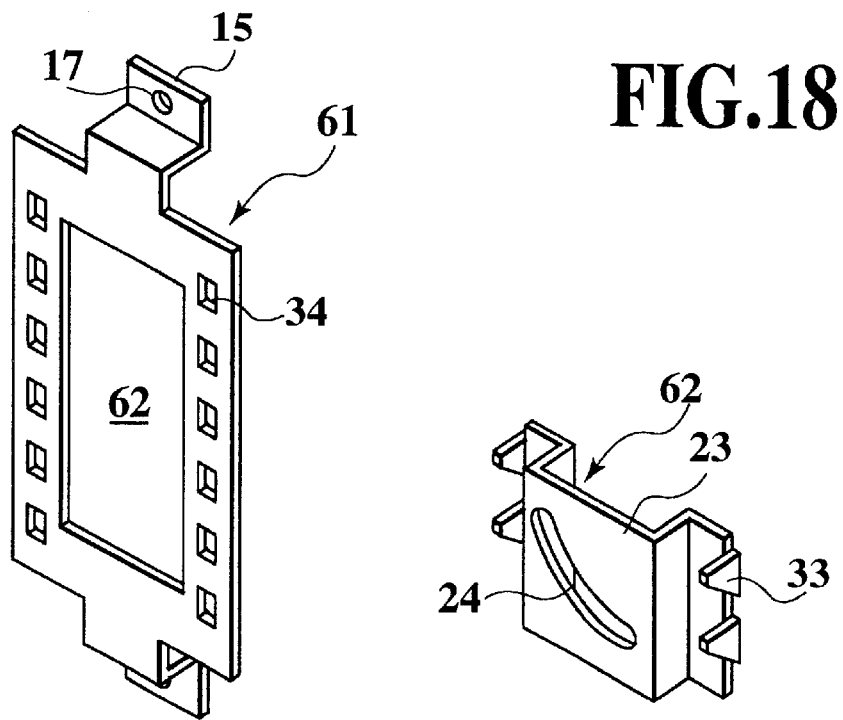
FIG. 18 is an exploded perspective view showing an example of another engaging part between the slider and rail.

As shown in FIG. 17, engaging protrusions 33 of the height adjuster 32 can be formed at the edges of the long hole 62 of the rail 63 so as to protrude toward the pillar 11, with engaging depressions 34 being formed on the two sides of the hat-shaped slider 63. As shown in FIG. 18, it is alternately possible to form engaging protrusions 33 of the height adjuster 32 on the two side edges of the slider 63 so as to face toward the inside of the passenger compartment, with engaging depressions 34 being formed on the center part 14 of the rail 61.

Other aspects of the third embodiment are the same as described with regard to the first and second embodiments, both in operation and achieved effect.

It is also possible to apply the variations of returning parts 24 shown in FIG. 4 and the variations of the sliding part 29 shown in FIG. 5 to the third embodiment.

Figure 19:
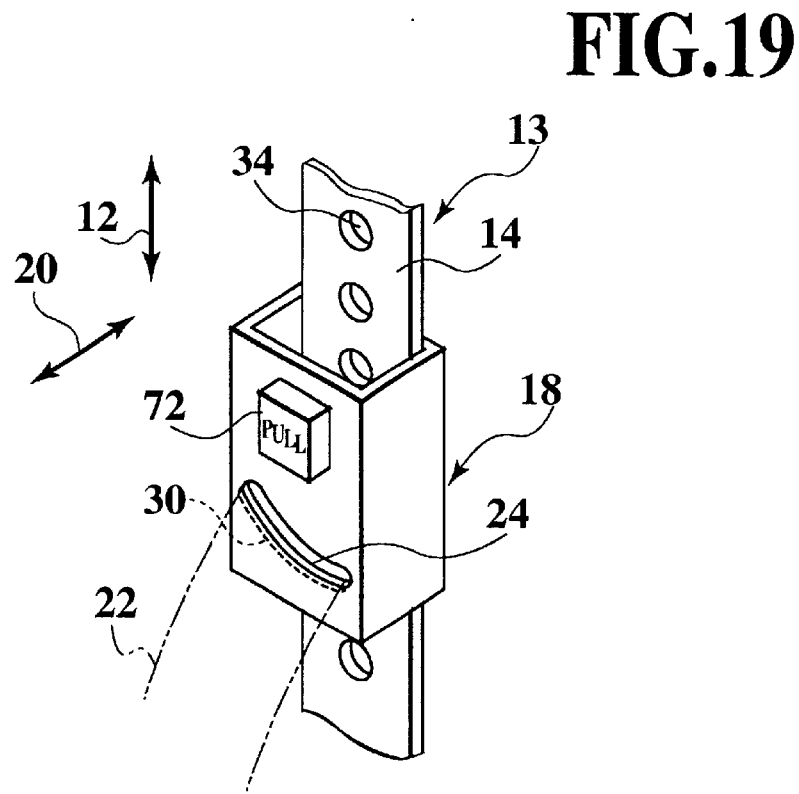
FIG. 19 is a perspective view of the fourth embodiment of the present invention.
Figure 20A:
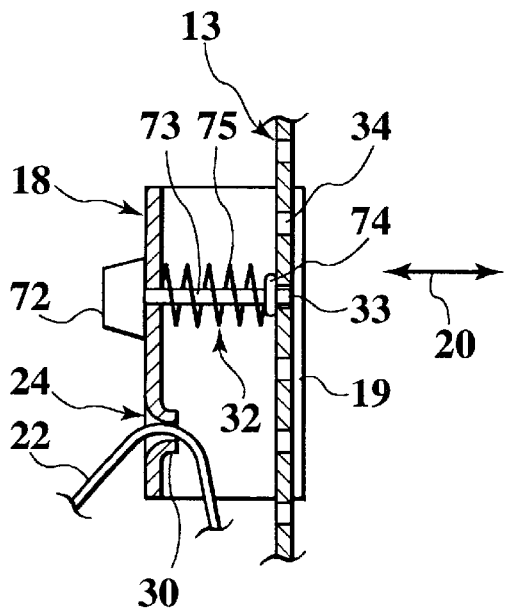
FIG. 20A is a partial perspective view of the fourth embodiment.
Figure 20B:
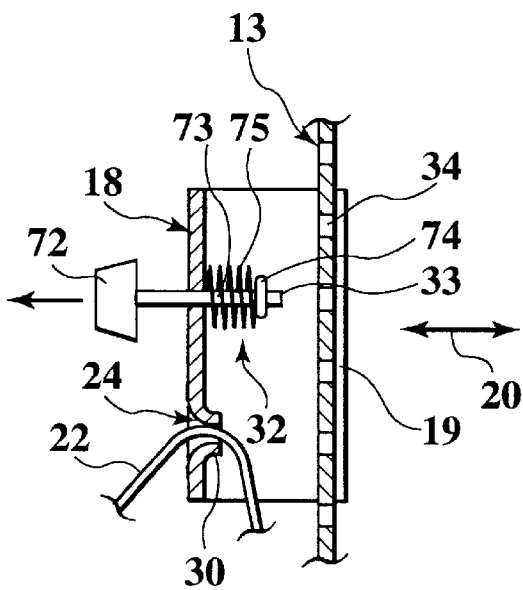
FIG. 20B is another partial perspective view of the fourth embodiment.

FIG. 19 and FIG. 20 show the fourth embodiment of the present invention. Elements in this embodiment which correspond to equivalent elements in the first to third embodiments are assigned the same reference numerals and will be described using those reference numerals.

In terms of configuration, the fourth embodiment, similar to the first embodiment, has a rail 63 having a long rectangular center part 14 and a slider 18 having a C-shaped cross-section and adjusts the height as follows.

There is a plurality of engaging depressions 34 formed in the center part of the rail 13 spaced apart from one another in the lengthwise direction 12 of the rail 13. A shaft 73 having a knob 72 at its rear end is inserted through the slider 18 in the direction of the width of the vehicle toward the pillar 11 so as to be freely movable in its axial direction, an endpiece 74 being formed on the front end of the shaft 73, with a coil spring 75 being disposed between the endpiece 74 and the slider 18 so that the impelling force of the coil spring 75 causes an engaging protrusion 33 at the front end of the shaft 73 to engage in an engaging depression 34 of the rail 13.

The operation of the fourth embodiment is as follows.

Because in the normal condition, the coil spring 75 of the height adjusting means disposed between the rail 13 and the slider 18 impels the engaging protrusion 33 at the end of the shaft 73 so that it engages with an engaging depression 34 of the rail 13, there is engagement between the engaging protrusion 33 and an engaging depression 34, this acting to lock the slider 18 with respect to the rail 13.

When the height is to be adjusted, the button 72 is pulled toward the inside of the passenger compartment of the vehicle, in opposition to the impelling force of the coil spring 75. By doing this, the engagement between the engaging protrusion 33 and the engaging depression 34 is released, thereby releasing the locking of the slider 18 with respect to the rail 13.

While pulling on the knob toward the inside of the passenger compartment, the slider 18 is slid along the rail 13 in the up-and-down direction of the vehicle, so as to adjust its height.

After the desired height is achieved, the knob 72 is released, enabling the resilience force of the coil spring 75 to cause engagement between the engaging protrusion 33 and an engagement depression 34 on the rail 18, thereby locking the slider 18 to the rail 13 once again.

Thus, by pulling the knob 72 toward the pillar 11, it is easy to adjust the height, and by simply releasing the knob 72, the locked condition is restored.

Other aspects of the fourth embodiment are the same as described with regard to the first to third embodiments, both in operation and achieved effect.

Figure 21:
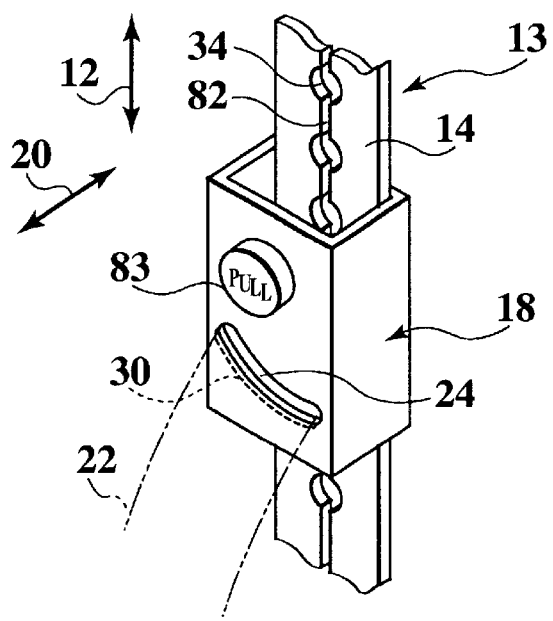
FIG. 21 is a perspective view of the fifth embodiment of the present invention.
Figure 22A:
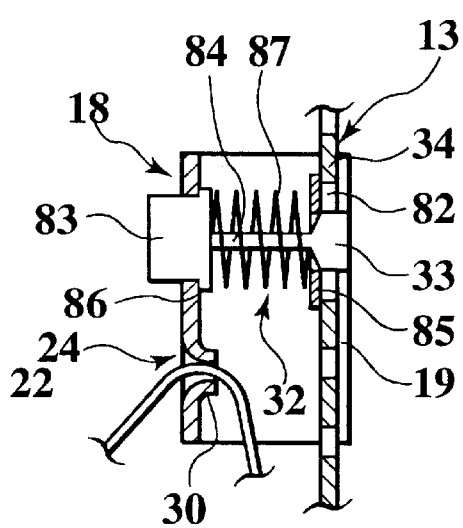
FIG. 22A is a partial perspective view of the fifth embodiment.
Figure 22B:
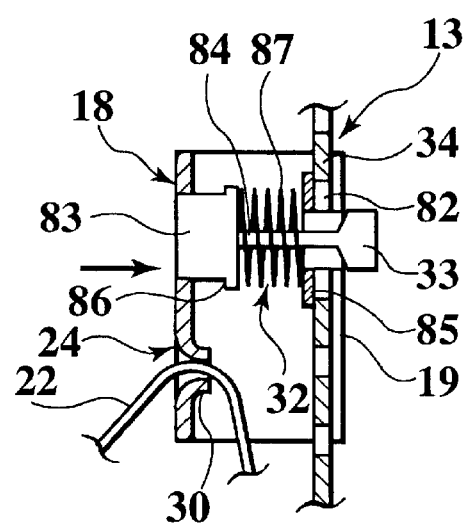
FIG. 22B is another partial perspective view of the fifth embodiment.

FIG. 21 and FIG. 22 show the fifth embodiment of the present invention. Elements in this embodiment which correspond to equivalent elements in the first embodiment are assigned the same reference numerals and will be described using those reference numerals.

In terms of configuration, the fifth embodiment of the present invention, similar to the first embodiment, has a rail 13 with a long rectangular center part 14, a slider 18 having a substantially C-shaped cross-section, and adjusts the height as follows.

There is a plurality of engaging depressions 34 formed in the center part of the rail 13 spaced apart from one another in the lengthwise direction 12 of the rail 13, each of the engaging depressions 34 being mutually connected via a slit 82. A shaft 84 having a button 83 at its rear end is inserted through the slider 18 in the direction of the width of the vehicle toward to the pillar 11 so as to be freely movable in its axial direction, the impelling force of a coil spring 87 that is disposed between a pressure plate 85 fitted over the front end area of the shaft 84 and a part of the pushbutton 18 that is inside the slider 18 causing the engaging protrusion on the end of the shaft 84 to be inserted into and engaged with an engaging depression 34.

The operation of the fifth embodiment is as follows.

Because in the normal condition, the coil spring 87 of the height adjusting means disposed between the rail 13 and the slider 18 impels the engaging protrusion 33 formed on the end of the shaft 84 toward an engaging depression 34 of the rail 13, there is engagement between the engaging protrusion 33 and the engaging depression 34, this acting to lock the slider 18 with respect to the rail 13.

When the height is to be adjusted, the pushbutton 83 is pressed toward the outside of the passenger compartment, so that the engagement between the engaging protrusion 33 and the engaging depression 34 is released, thereby releasing the locking of the slider 18 with respect to the rail 18.

While pushing on the pushbutton 83 toward the outside of the passenger compartment, the slider 18 is slid along the rail 13 in the up-and-down direction of the vehicle, so as to adjust its height.

After the desired height is achieved, the knob 83 is released, enabling the resilience force of the coil spring 87 to cause engagement between the engaging protrusion 33 and an engagement depression 34 on the rail 18, thereby locking the slider 18 to the rail 13 once again.

Thus, by pressing the pushbutton 83 toward the pillar 11, it is easy to adjust the height, and by simply releasing the knob 72, the locked condition is restored.

Other aspects of the fifth embodiment are the same as described with regard to the first to fourth embodiments, both in operation and achieved effect.

The above has been a detailed description of the first to the fifth embodiments of the present invention. It will be understood however, that the actual configuration of the present invention is not limited to the foregoing embodiments, and can take a number of varied forms within the scope of the present invention.

Figure 6:
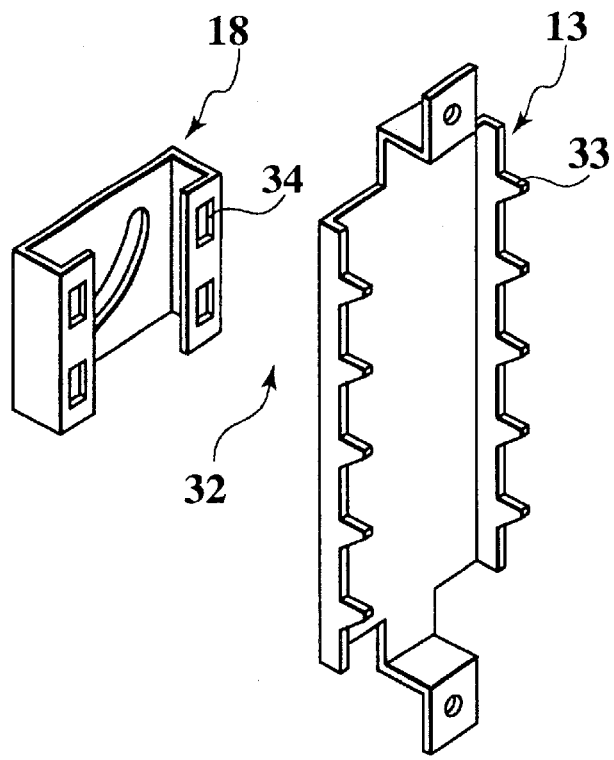
FIG. 6 is an exploded perspective view showing the engaging part between the slider and rail shown in FIG. 1.
Figure 7:
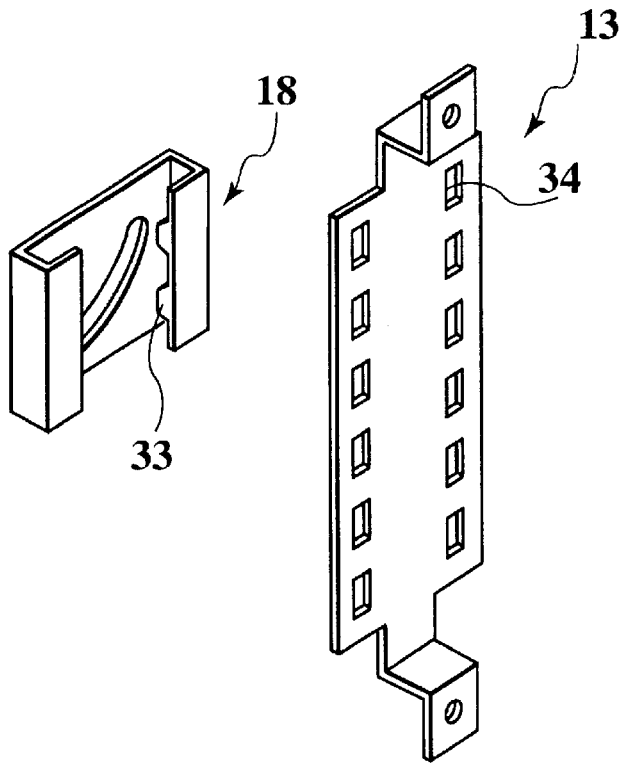
FIG. 7 is an exploded perspective view showing another example of the engaging part between the slider and rail.

In the first embodiment, for example, while the rail 13 has engaging protrusions 33 provided as engaging means and facing in the width direction of the vehicle, and engaging depressions 34 formed as engaging means that engage with the engaging protrusions 33 on the two bent ends of the C-shaped slider 18, there is no particular restriction to this arrangement, it being alternately possible within the scope of the present invention to have, as shown in FIG. 6, the alternate arrangement in which engaging protrusions 33 are formed so as to protrude from the two ends of the rail 13 toward the pillar 11, with engaging depressions 34 formed in the two bent ends 19 of the C-shaped slider 18. As shown in FIG. 7, it is also possible to have engaging protrusions 33 formed on the two ends of the C-shaped slider 18 facing toward the inside of the passenger compartment of the vehicle, with engaging depressions 34 formed on the two sides of the rail 13.

Additionally, it is possible for the engaging depressions to be mere depressions or also to be holes. The impelling means 35 can be a leaf spring 36 of any of the configurations shown in FIG. 8B through 8F. Even if the leaf spring 36 is the I-shaped spring shown in FIG. 8B or a C-shaped spring as shown in FIG. 8C, the variations of these as shown in FIG. 8D to FIG. 8F can also be used, in which case, as shown in FIG. 3, the base of the leaf spring 36 is held to the slider 18 by means of a pin 37 or the like, the end part of the leaf spring 36 being made to push against the rail 13. The ends of the leaf spring 36 can also have covers 38 attached to prevent the springs from coming loose.

Additionally, the impelling means 35, as shown in FIG. 9, can be a combination of a shoe 39 and a coil spring 40. If the shoe 39 is made of a material that enables the achievement of a good sliding condition, so as to reduce both operating force and operating noise, it can have the semicircular shape shown in FIG. 10B, in which case a shaft 42 having a flange 41 is inserted from the end in the width direction of the vehicle and so that it is movable toward the slider 18 and pillar side, the impelling force of the coil spring fitted over the shaft 42 pressing the shoe 39 mounted to the end of the shaft 42 up against the rail 13.

What is claimed is:

1. A seat belt shoulder adjuster structure comprising:
   a rail disposed along and fixed to a pillar;
   a slider having a substantially C-shaped cross section including a center part comprising a surface substantially parallel to an opposing surface of said rail that faces a passenger compartment of a vehicle, said slider being movably fixed to the rail so as to enable up and down movement, and
   a webbing returning part in said surface of said center part of said slider,
   wherein webbing of a seat belt passes between the rail and the slider via the webbing returning part and into the passenger compartment of the vehicle.

2. A seat belt shoulder adjuster according to claim 1, wherein the webbing returning part is an opening formed in the center part of the slider, the webbing passing therethrough.

3. A seat belt shoulder adjuster according to claim 1, wherein the webbing returning part is a cutout formed at the top end of the slider, the webbing passing therewithin.

4. A seat belt shoulder adjuster according to claim 1, wherein a part of the webbing returning part that comes into contact with the webbing is arc-shaped.

5. A seat belt shoulder adjuster according to claim 1, wherein the webbing returning part has a webbing sliding part.

6. A seat belt shoulder adjuster according to claim 5, wherein the sliding part is a curved surface along the webbing returning part.

7. A seat belt shoulder adjuster according to claim 5, wherein the sliding part is made of resin in contact with the webbing returning part.

8. A seat belt shoulder adjuster according to claim 1 further comprising:
an engaging part that provides engagement between the slider and the rail; and
an impelling member for impelling the engaging part in the engagement direction, and releasing the engagement condition when operated in opposition to the impelling force thereof.

9. A seat belt shoulder adjuster according to claim 8, wherein the engaging part is formed by an engaging protrusion formed on both edges of either the rail or the slider, and an engaging depression formed on both edges of the other of the rail and slider.

10. A seat belt shoulder adjuster according to claim 9, wherein the impelling member is a leaf spring disposed between the rail and the slider so as to impel either the engaging protrusions or the engaging depressions in a direction that causing engagement with the other of the engaging depressions or protrusions.

11. A seat belt shoulder adjuster according to claim 10, wherein said leaf spring comprises a first lateral element and a transverse element extending therefrom, wherein said leaf spring is disposed within said slider so that said webbing passes over said transverse element.

12. A seat belt shoulder adjuster according to claim 11, wherein said leaf spring further comprises a second lateral element, wherein said transverse element is connected at one end to the first lateral element and is connected at another end to the second transverse element, and wherein said leaf spring is disposed within said slider so that said webbing passes over said transverse element and between said first lateral element and said second lateral element.

13. A seat belt shoulder adjuster according to claim 12, wherein said first lateral element and said second lateral element have substantially a same shape and are each roughly bisected by the lateral element, forming an H-shaped leaf spring.

14. A seat belt shoulder adjuster according to claim 13, wherein said first lateral element and said second lateral element are of different lengths.

15. A seat belt shoulder adjuster according to claim 14, wherein said first lateral element and said second lateral element extend in opposite directions from said transverse element.

16. A seat belt shoulder adjuster comprising:
a rail disposed along and fixed to a pillar;
a slider having a substantially C-shaped cross section including a center part comprising a surface substantially parallel to an opposing surface of said rail that faces a passenger compartment of a vehicle, said slider being movably disposed over the rail;
an engaging part that provides engagement between the slider and the rail;
an impelling member for impelling the engaging part in the engagement direction, and releasing the engagement condition when operated in opposition to the impelling force thereof, thereby enabling movement of the slider along the rail; and
a webbing returning part formed in said surface of said center part of the slider,
wherein webbing of a seat belt passes between the rail and the slider via the webbing returning part and into the passenger compartment of the vehicle.

17. A seat belt shoulder adjuster according to claim 16, wherein the webbing returning part is an opening formed in the center part of the slider, the webbing passing therethrough.

18. A seat belt shoulder adjuster according to claim 16, wherein the webbing returning part is a cutout formed at the top end of the slider, the webbing passing therewithin.

19. A seat belt shoulder adjuster according to claim 16, wherein a part of the webbing returning part that comes into contact with the webbing is arc-shaped.

20. A seat belt shoulder adjuster according to claim 16, wherein the webbing returning part has a webbing sliding part.

21. A seat belt shoulder adjuster according to claim 16, wherein the sliding part is a curved surface along the webbing returning part.

22. A seat belt shoulder adjuster according to claim 16, wherein the sliding part is made of resin in contact with the webbing returning part.

23. A seat belt shoulder adjuster according to claim 16, wherein the engaging part is formed by an engaging protrusion formed on both edges of either the rail or the slider, and an engaging depression formed on both edges of the other of the rail and slider.

24. A seat belt shoulder adjuster according to claim 13, wherein the impelling member is a leaf spring disposed between the rail and the slider so as to impel either the engaging protrusions or the engaging depressions in a direction that causing engagement with the other of the engaging depressions or protrusions.

25. A seat belt shoulder adjuster according to claim 24, wherein said leaf spring comprises a first lateral element and a transverse element extending therefrom, wherein said leaf spring is disposed within said slider so that said webbing passes over said transverse element.

26. A seat belt shoulder adjuster according to claim 25, wherein said leaf spring further comprises a second lateral element, wherein said transverse element is connected at one end to the first lateral element and is connected at another end to the second transverse element, and wherein said leaf spring is disposed within said slider so that said webbing passes over said transverse element and between said first lateral element and said second lateral element.

27. A seat belt shoulder adjuster according to claim 26, wherein said first lateral element and said second lateral element have substantially a same shape and are each roughly bisected by the lateral element, forming an H-shaped leaf spring.

28. A seat belt shoulder adjuster according to claim 27, wherein said first lateral element and said second lateral element are of different lengths.

29. A seat belt shoulder adjuster according to claim 28, wherein said first lateral element and said second lateral element extend in opposite directions from said transverse element.

* * * * *